Sept. 26, 1961   R. R. HANSON ET AL   3,001,384
SPACE COOLERS

Filed June 14, 1957   7 Sheets-Sheet 1

INVENTORS
ROY R. HANSON AND
ELMER A. BRADEN

BY *Alfred W. Petchaft*

ATTORNEY

INVENTORS
ROY R. HANSON AND
ELMER A. BRADEN

BY *Alfred W. Petchaft*

ATTORNEY

Sept. 26, 1961    R. R. HANSON ET AL    3,001,384
SPACE COOLERS

Filed June 14, 1957    7 Sheets-Sheet 3

INVENTORS
ROY R. HANSON AND
ELMER A. BRADEN

BY Alfred W. Petchaft

ATTORNEY

Sept. 26, 1961 R. R. HANSON ET AL 3,001,384
SPACE COOLERS
Filed June 14, 1957 7 Sheets-Sheet 4

INVENTORS
ROY R. HANSON AND
ELMER A. BRADEN

BY Alfred W. Petchaft

ATTORNEY

Sept. 26, 1961 R. R. HANSON ET AL 3,001,384
SPACE COOLERS
Filed June 14, 1957 7 Sheets-Sheet 5

INVENTORS
ROY R. HANSON AND
ELMER A. BRADEN
BY Alfred W. Petchaft
ATTORNEY

INVENTORS
ROY R. HANSON AND
ELMER A. BRADEN

Sept. 26, 1961 R. R. HANSON ET AL 3,001,384
SPACE COOLERS
Filed June 14, 1957 7 Sheets-Sheet 7

INVENTORS
ROY R. HANSON AND
ELMER A. BRADEN

BY *Alfred W. Petchaft*

ATTORNEY

3,001,384
SPACE COOLERS

Roy R. Hanson, Rte. 1, Box 588, Maryland Heights, Mo., and Elmer A. Braden, 2153 S. 6th St., Springfield, Ill., assignors of one-sixth to William H. Anderson, Glencoe, Mo., one-fourth to Joseph H. Schierman, and one-fourth to George A. Blase, St. Louis, Mo.

Filed June 14, 1957, Ser. No. 665,744
14 Claims. (Cl. 62—499)

This invention relates in general to refrigerating equipment and, more particularly, to space coolers.

It is a primary object of the present invention to provide a space cooler employing a rotatable compressor housing having an evaporator and a condenser mounted on and rotatable therewith.

It is also an object of the present invention to provide a space cooler of the type stated in which the movement of the housing and related elements will produce all necessary circulation of air.

It is an additional object of the present invention to provide a space cooler of the type stated which utilizes a novel rotary type compressor.

It is another object of the present invention to provide a device of the type stated which can be easily, economically and compactly constructed.

It is a further object of the present invention to provide a space cooler of the type stated which is compact and contains a minimum number of moving parts.

It is also an object of the present invention to provide a space cooler having a unique type of control means which compensates for fluctuations in speed and demand.

With the above and other objects in view, our invention resides in the novel features of form, construction, arrangement, and combination of parts presently described and pointed out in the claims.

Figure 1:
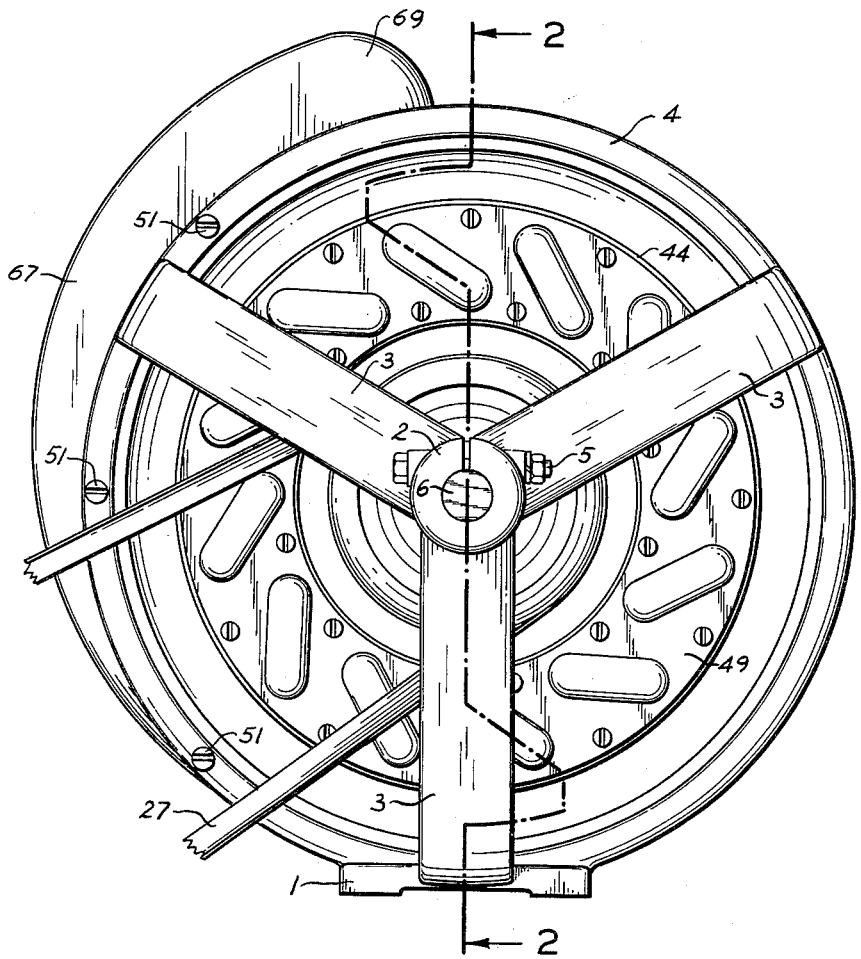
FIG. 1 is a rear elevational view of a rotary refrigeration machine constructed in accordance with and embodying the present invention.
Figure 17:
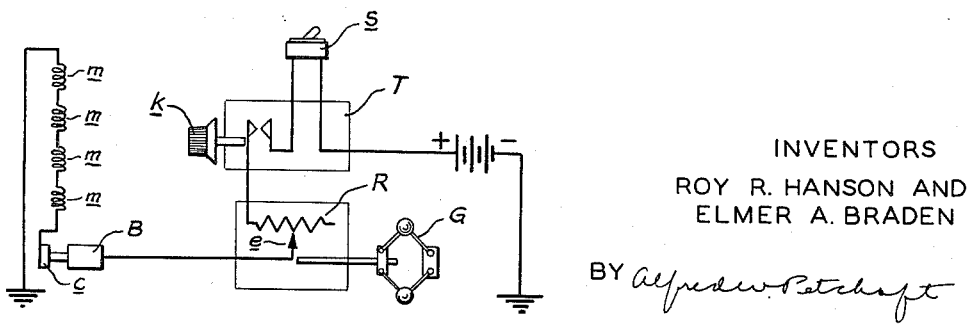
Figure 2:
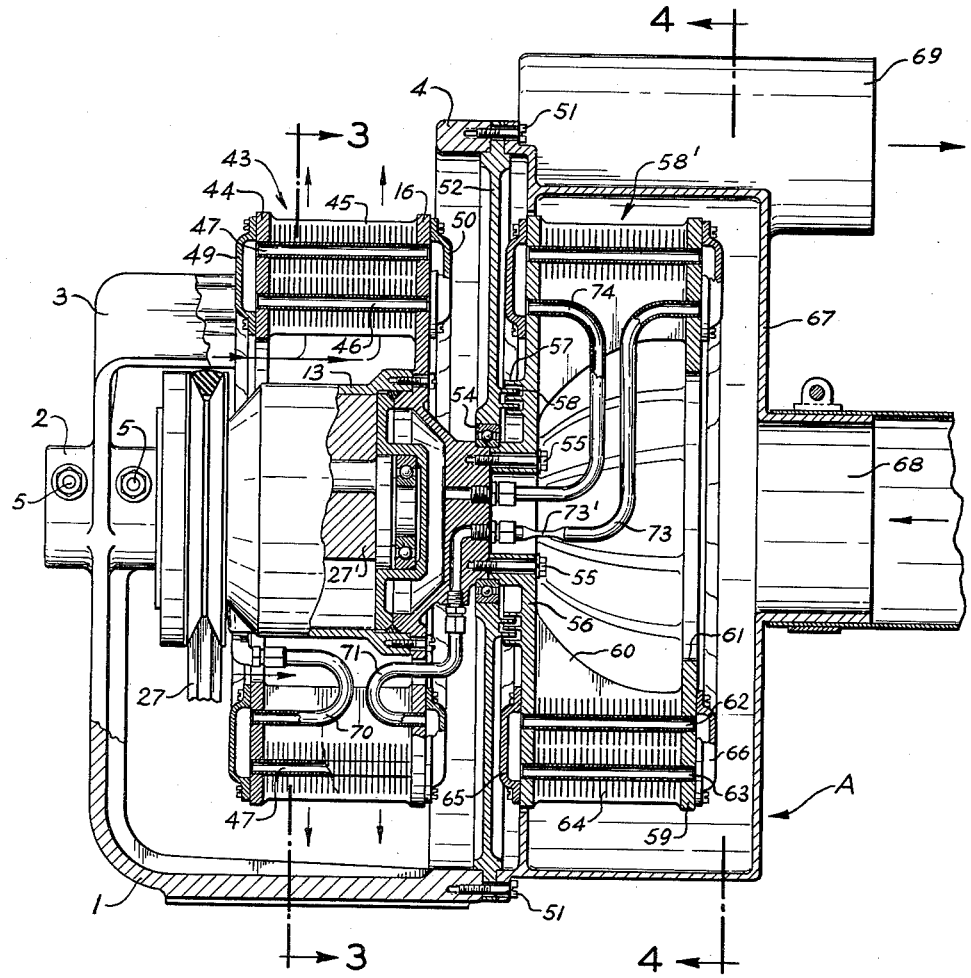
FIG. 2 is a sectional view taken alone line 2—2 of FIG. 1.
Figure 8:
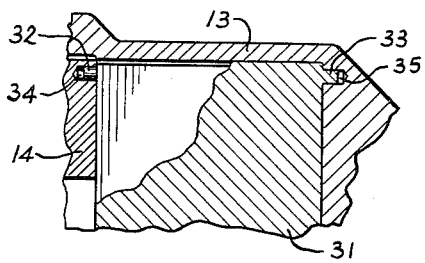
Figure 3:
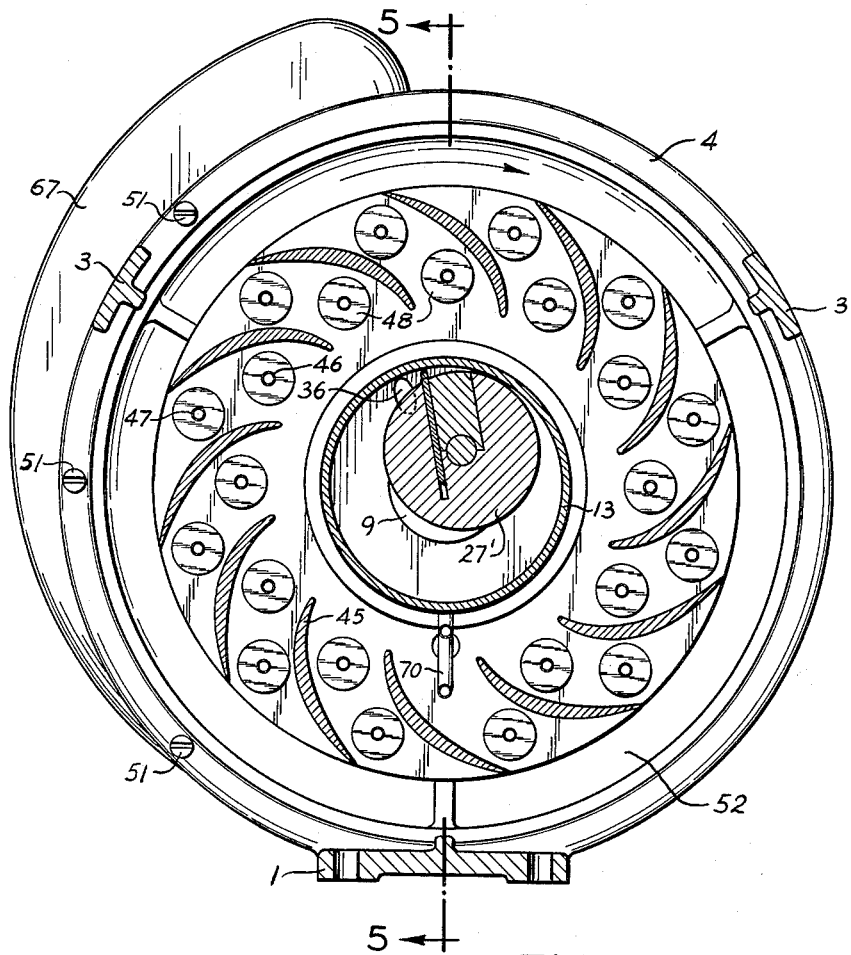
Figure 9:
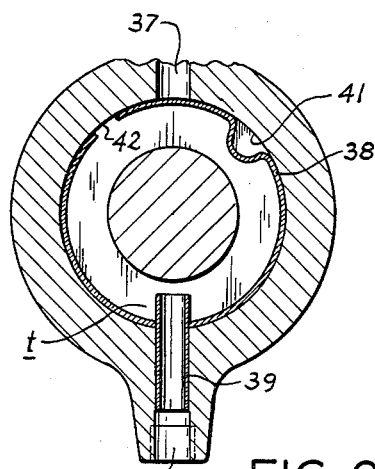
Figure 4:
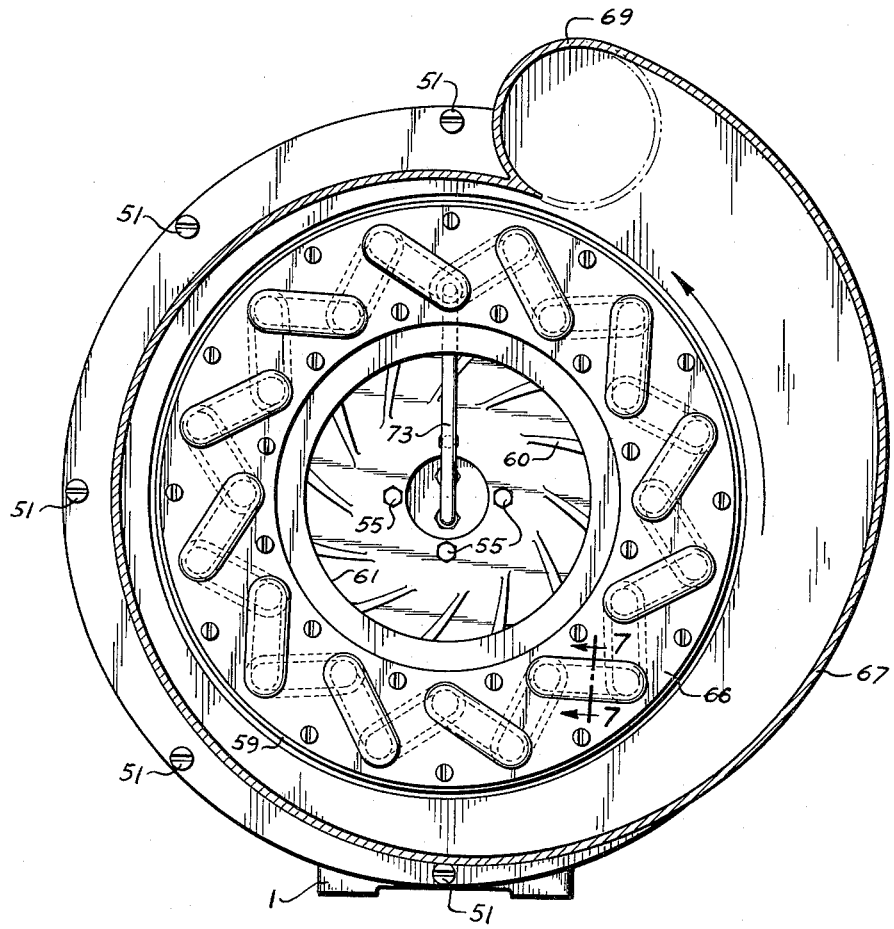
Figure 7:
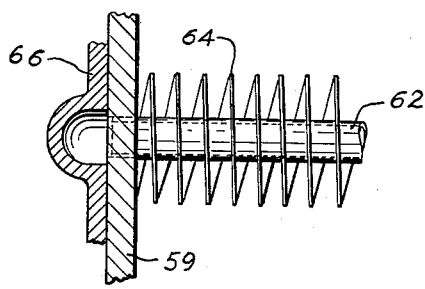
Figure 5:
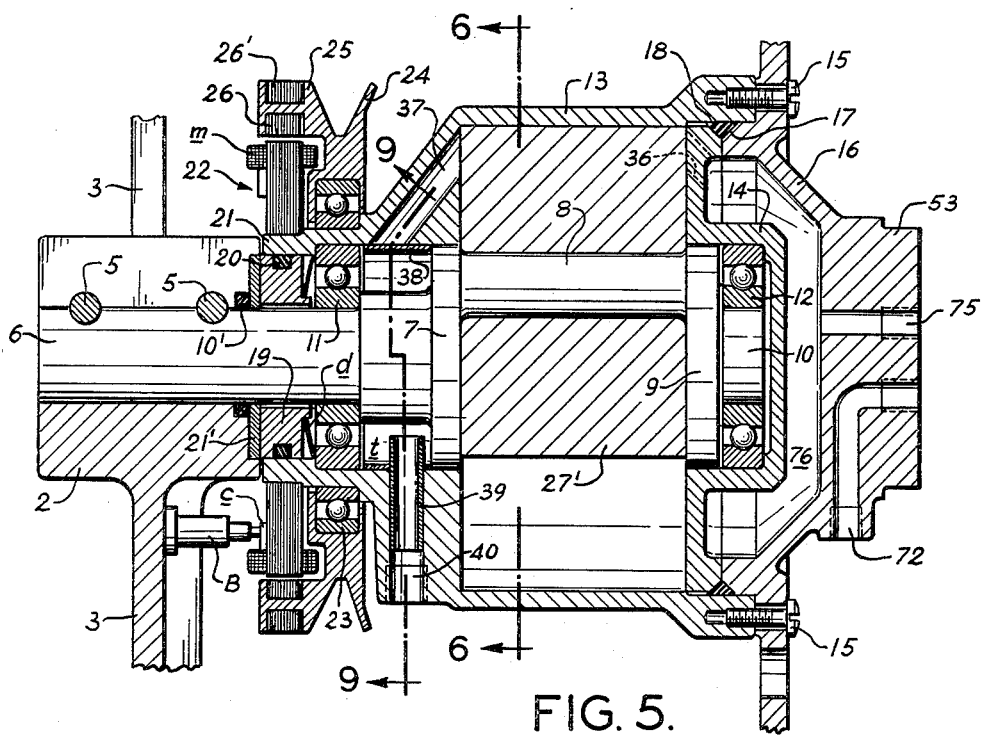
Figure 6:
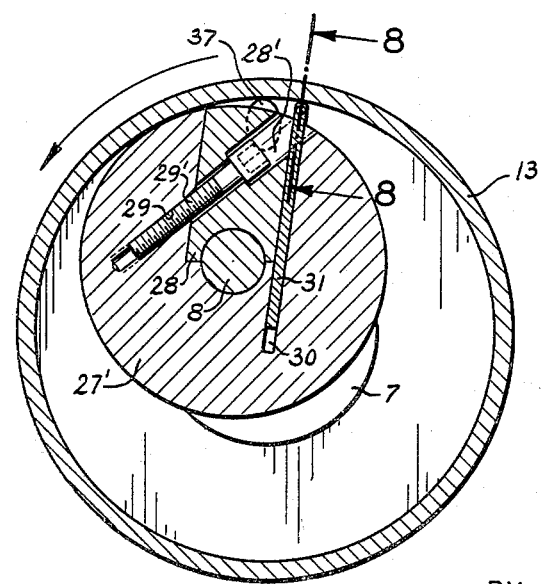
Figure 10:
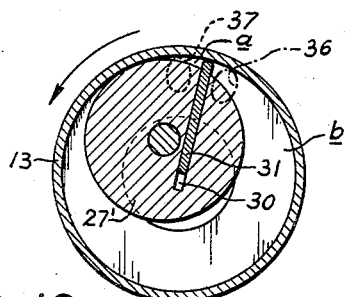
Figure 19:
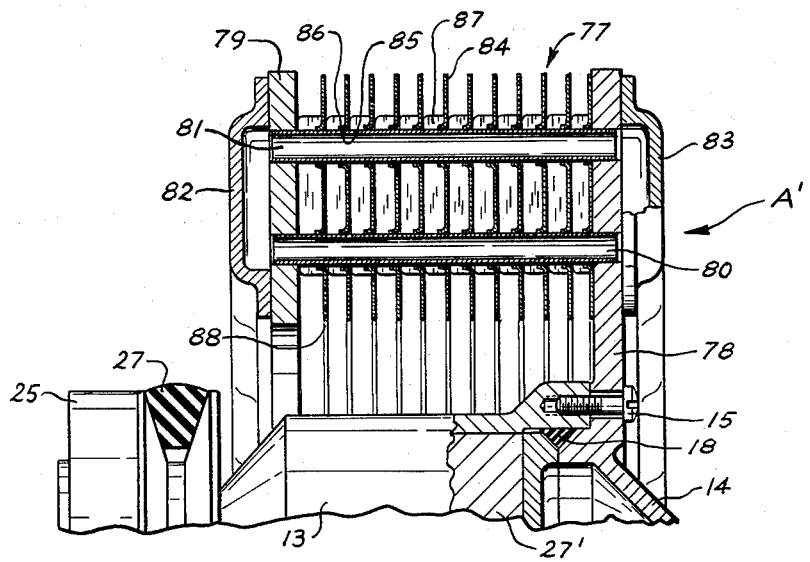
Figure 20:
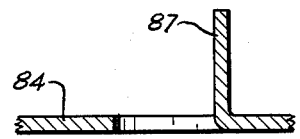
Figure 18:
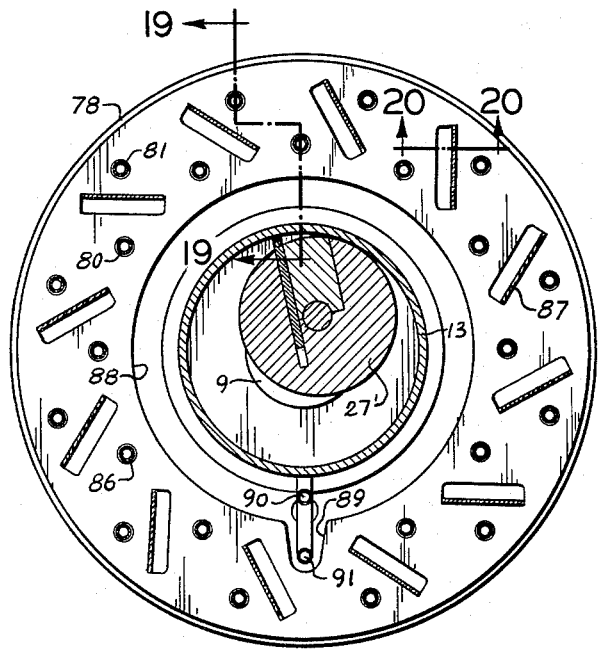

FIGS. 3 and 4 are sectional views taken along lines 3—3 and 4—4, respectively, of FIG. 2;

FIG. 5 is a fragmentary sectional view taken along line 5—5 of FIG. 3;

FIG. 6 is a fragmentary sectional view taken along line 6—6 of FIG. 5;

FIG. 7 is a fragmentary sectional view taken along line 7—7 of FIG. 4;

FIG. 8 is a fragmentary sectional view taken along line 8—8 of FIG. 6;

FIG. 9 is a fragmentary sectional view taken along line 9—9 of FIG. 5;

FIGS. 10 to 16, inclusive, are diagrammatic views similar to FIG. 6 and showing various operative positions of the compressor;

FIG. 17 is a wiring diagram showing a preferred control circuit forming a part of the present invention;

FIG. 18 is a fragmentary sectional view showing a modified form of the present invention; and FIGS. 19 and 20 are fragmentary sectional views taken along lines 19—19 and 20—20, respectively, of FIG. 18.

Referring now in more detail and by reference characters to the drawings, which illustrate a preferred embodiment of the present invention, A designates a space cooler comprising a support casting 1 integrally provided on one end with a split mounting hub 2 provided with a plurality of bracing ribs 3 which terminate in an enlarged annular ring 4. Rigidly secured to the split hub 2 by means of bolts 5 is a stationary rotor shaft 6 provided with an enlarged collar 7 having an eccentric shaft portion 8, the forward end of which is formed with another collar portion 9 and a short stub portion 10. The hub 2 is internally grooved for reception of an annular sealing ring 10' which bears sealingwise against the shaft 6. Journaled on the stationary rotor shaft 6 by means of spaced aligned bearings 11, 12, is a rotatable cylindrical compressor housing 13 provided internally on one end with a retaining cap 14 for snug-fitting reception of the bearing 12. Secured to the housing 13 by means of bolts 15 adjacent the retaining cap 14 is a condenser support casting 16, the retaining cap 14, housing 13, and support casting 16 forming a V-shaped groove 17 for reception of an annular sealing ring 18. Rotatably mounted on the shaft 6 between the hub 2 and bearing 11 is a collar 19 peripherally grooved for reception of a sealing ring 20 which bears sealingwise against a diametrically reduced section 21 of the housing 13. Interposed between the collar 19 and the hub 2 is a seal 21' and disposed between the bearing 11 and collar 19 is an annular disc-like spring $d$ which urges the collar 19 against the seal 21'.

Rigidly mounted on the reduced portion 21 adjacent the hub 2 is a conventional electro-magnetic clutch member 22 having coils $m$ and a conductor ring $c$ which is contacted by a stationary brush B mounted on the support casting 1. Journaled on the reduced section 21 by means of a bearing 23 is a pulley 24 having an annular flange 25 which extends concentrically around the clutch member 22 and includes fixed magnetic rings 26, 26', adapted for electro-magnetic interlocking with the clutch member 22, and trained around the pulley 24 is a V-belt 27 whereby the pulley may be driven by a suitable prime mover (not shown). The clutch coils $m$ are connected in a control circuit as shown in FIG. 17 and presently more fully described. It will, of course, be evident that other types of clutch mechanisms can be employed if desired.

Rotatably mounted on the eccentric shaft portion 8 is a cylindrical compressor rotor 27' split in the provision of a mounting block 28 provided with a chordwise extending slot 28' which is aligned with a tapped hole 29 for reception of a locking screw 29'. Also formed in the rotor 27' and disposed radially with respect to the housing 13 and in contact therewith is a slot 30 for slide-fitting reception of a thin flat compressor vane 31, the outer radial end of which is integrally provided with opposed pins 32, 33, which snugly engage corresponding recesses 34, 35, the recess 34 being formed in the retaining cap 14 and the recess 35 being formed in the housing 13. Also formed in the retaining cap 14 is an inlet port 36, and similarly formed in the housing 13 opposite the inlet port 36 and slightly offset therefrom, is an angularly inclined high pressure discharge passage 37 which communicates through a check valve 38 to a short tube 39 located in a condenser inlet line 40. As seen by reference to FIG. 9, the check valve 38 is formed of a resilient annular ring which normally bears against the wall of a cavity 41 and is disposed across the passage 37, the check valve 38 being split at 42 so as to permit a slight diametral contraction of the valve 38 and resultant opening of the passage 37, all for purposes presently more fully appearing.

Mounted on the condenser support plate 16 is a condenser 43 including an outer end plate 44 which is rigidly supported in spaced relation to the plate 16 by a series of air impeller vanes 45, and extending between the plates 16, 44, are radially inner and outer series of tubes 46, 47, provided with heat dissipation fins 48. Bolted to the plates 16, 44, are cap members 49, 50, which provide communication between the tubes 46, 47. As seen by reference to FIGS. 2 and 3, the cap members 49, 50, are so positioned that they provide successive communication between the tubes 46, 47, so as to form a single conduit path through which the refrigerant may flow. Thus, the refrigerant will flow from one of the tubes 46 through one of the cap members 50, through one of the tubes 47, through one of the cap members 49, and then through the next succeeding tube 47, and so on, throughout the condenser unit 43.

Secured by means of bolts 51 to the outer peripheral portion 4 of the support casting 1 is an insulating plate 52 which is supported on the hub portion 53 of the condenser support plate 16 by means of a bearing 54. Also secured to the hub portion 53 by means of bolts 55 is an evaporator support plate 56 provided with a series of axial fins 57 which interfit between corresponding fins 58 on the insulator plate 52 so as to provide a labyrinth seal. Mounted on the plate 56 is an evaporator 58' including an end plate 59 rigidly supported in spaced relation to the plate 56 by radially extending air impeller vanes 60, the end plate 59 being provided with a large central opening 61. Extending between the plates 56, 59, are radially inner and outer series of tubes 62, 63, provided with heat transfer fins 64 and bolted to the plates 56, 59, are cap members 65, 66, which provide successive communication between tubes 62, 63, in the same manner as that of the condenser 43, previously described, so as to form a continuous evaporator line. Secured to the outer periphery of the heat insulator plate 52 and enclosing the evaporator 58' is an air cooling chamber 67 provided with a warm air inlet passage 68 aligned with the opening 61 and formed on the outer periphery of the air cooling chamber 67 is a cold air discharge duct 69. As best seen by reference to FIGS. 2 and 5, the condenser inlet line 40 communicates with the condenser 43 through a conduit 70 and the condenser discharge line 71 communicates with a passageway 72 in the hub portion 53 which, in turn, communicates with an evaporator inlet line 73 having a capillary tube 73' formed therein. The evaporator discharge line 74 communicates with a passageway 75 in the hub portion 53 which, in turn, is open to the space 76 between the hub portion 53 and cap member 14, the space 76 communicating with the compressor inlet port 36.

As shown in FIG. 17, the space cooler A is preferably operated in combination with a control circuit which includes a main switch s and a thermostat T having a manually settable control knob k. Also included within the circuit is a rheostat R, the sliding element e of which is shifted responsive to the movement of a governor G. The governor, which may be of any conventional design, is connected to the sliding element e of the rheostat R in such a manner that, as the speed of the prime mover increases, a progressively larger amount of resistance is thrown into the circuit so as to reduce the strength of the electrical coupling between the coils m of the electro-magnetic clutch member 22 and the magnetic rings 26, 26'. Consequently, as the speed of the prime mover increases, there will be a greater degree of slippage between the electro-magnetic clutch member 22 and the pulley 24. Consequently, where the space cooler A is employed in connection with an automobile and the prime mover is the automobile engine, the speed of the compressor will remain substantially constant, notwithstanding wide fluctuations in engine speed. The thermostat T and switch s will, obviously, be mounted within the interior of the automobile and can be adjusted to maintain any desired degree of temperature by appropriate adjustment of the knob k. Similarly, the entire unit can be turned on and off by appropriate manipulation of the switch s.

Figure 11:
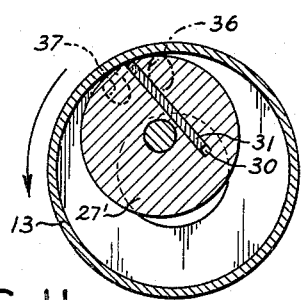
Figure 12:
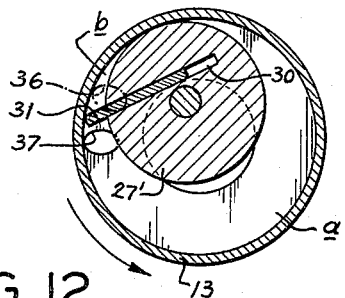
Figure 13:
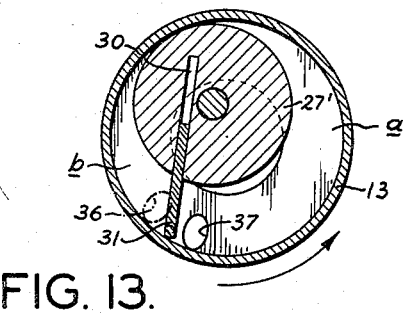
Figure 14:
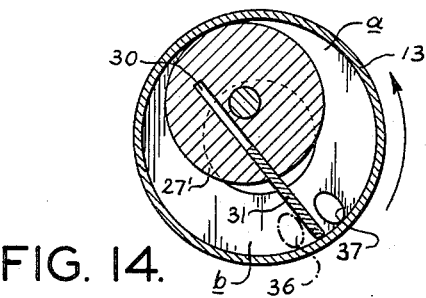
Figure 15:
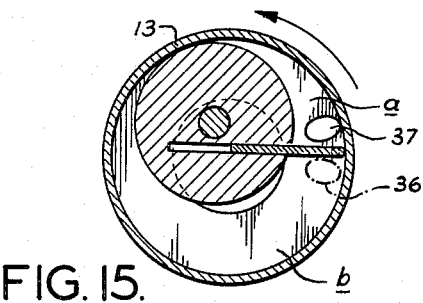
Figure 16:
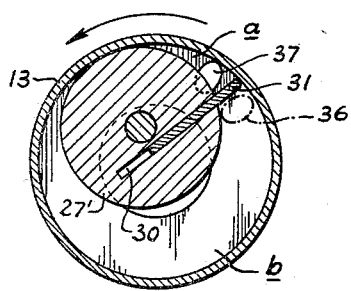

In use, the clutch member 22 is normally disengaged and the belt-driven pulley 24 is freely rotatable on the reduced portion 21 of the housing 13. Upon engagement of the clutch member 22, power is transmitted to the housing 13, causing it and the condenser 43 and evaporator 58' to rotate in unison. During such rotation, the vane 31 will assume intermediate positions, such as shown in FIGS. 10 through 16, so as to compress the refrigerant in the chamber a formed by the rotor 27', the housing 13, and the cap member 14. During one full revolution of the housing 13, it can be seen that the chamber a, which communicates with the passage 37, gradually becomes smaller and smaller while the chamber b, which communicates with the inlet port 36, gradually becomes larger and larger. As the pressure within the chamber a reaches condenser pressure, the check valve 38 diametrally contracts so as to permit the compressed refrigerant to pass into the tube 39, through the line 40, into the conduit 70, and into the condenser 43. The increasing volume of the chamber b provides a reduced pressure on the outlet side of the evaporator 58' so as to draw the refrigerant therefrom. As the housing 13 and rotor 27' move from the relative positions shown in FIG. 10 to that shown in FIG. 12, they will momentarily assume an intermediate position, such as shown in FIG. 11, wherein the ports 36, 37, are passed across the rotor 27'.

By reason of the fact that the condenser 43 and evaporator 58' rotate rapidly, the refrigerant liquid which is contained therein will, as a result of centrifugal force, flow along those portions of the interior surfaces which are radially remote. Consequently, a substantial area of the coils will always be wetted by a rapidly flowing film of liquid refrigerant and the K-factor of the system is, therefore, high.

Warm air is drawn axially through the inlet passage 68 and through the opening 61, being drawn therethrough by the air impeller vanes 60 which force the air radially outwardly across the evaporator 58' so as to become cooled, whereupon the cool air is discharged through the duct 69. Air is also drawn by the air impeller vanes 45 axially along and over the housing 13 and is forced radially outwardly over the condenser 43 so as to provide a forced air cooling of the condenser 43.

Since small quantities of oil may occasionally leak from the bearings 11, 12, the circulation of such oil through the unit is effectively reduced since any oil entering the chamber 41 will be collected in an oil trap t formed by the tube 39 and check valve 38 and is held therein by the centrifugal force of the rotating housing 13.

It is also possible to provide a modified form of space cooler A', shown in FIGS. 18-20, similar to the space cooler A, previously described. In this form of the invention, a condenser 77 is provided with a support casting 78, outer end plate 79, inner and outer series of tubes 80, 81, and cap members 82, 83, all similar to, and interconnected in the same manner as, the corresponding parts of the condenser 43, previously described. Rigidly mounted on the tubes 80, 81, is a series of spaced parallel annular heat dissipation disks 84, each provided with spaced holes 85 through which the tubes 80, 81, extend, and surrounding the holes 85, are upstruck annular flanges 86 which bear against and grip the tubes 80, 81. Spanning the distance between successive disks 84 are circumferentially spaced, punched out, axially extending air impeller vanes 87. The disks 84 are also each provided with a large central opening 88 and a radially extending clearance slot 89 for reception of inlet and outlet conduits 90, 91.

During assembly of the condenser 77, the holes 85 are of such size as to permit the disks 84 to be easily slipped on the tubes 80, 81, and the disks 84 are held in spaced relation by the air impeller vanes 87. One of the conduits 90, 91, is then closed off and air under high pressure is introduced into the condenser 77, causing the tubes 80, 81, to diametrally expand a few thousandths of an inch into grip-forming engagement with the flanges 86, whereupon the tubes 80, 81, will remain snugly secured in position. It will, of course, be evident that an evaporator for the space cooler A' may also be constructed in the same manner as the condenser 77.

It should be understood that changes and modifications in the form, construction, arrangement, and combination of the several parts of the space coolers may be made and substituted for those herein shown and described without departing from the nature and principle of our invention.

Having thus described our invention, what we claim and desire to secure by Letters Patent is:

1. A space cooler comprising a compressor, said compressor including stationary base-forming means having a stationary rotor shaft therein, a housing rotatable on said rotor shaft, driving means external to the shaft and housing, means for operatively connecting said housing and said driving means so that the housing is rotated bodily upon the shaft, a condenser and an evaporator each having air impeller elements and each being rigidly mounted on and rotatable with the housing, said air impeller elements being constructed and arranged to discharge air radially outwardly of the axis of rotation, and fixed chamber-forming means enclosing said evaporator and being provided with inlet and outlet air openings.

2. A space cooler comprising a compressor, said compressor including stationary base-forming means having a stationary rotor shaft rigidly mounted thereon, a housing journalled upon and enclosing said shaft, driving means external to the shaft and housing, means for operatively connecting said housing and said driving means so that the housing is rotated bodily upon the shaft, a condenser and an evaporator each having air impeller elements and each being rigidly mounted on and rotatable with the housing, said air impeller elements being constructed and arranged to draw air axially of and discharge air radially outwardly of the axis of rotation, and fixed chamber-forming means operatively mounted on said base-forming means and extending annularly around the evaporator in the manner of a shroud for substantially enclosing said evaporator, said chamber-forming means being provided with inlet and outlet air openings whereby air can be circulated through said chamber-forming means as a result of rotation of the housing.

3. A space cooler comprising a compressor, said compressor including stationary base-forming means having a stationary rotor shaft rigidly mounted thereon, a housing rotatably journaled upon and enclosing said shaft, driving means external to the shaft and housing, means for operatively connecting said housing and said driving means so that the housing is rotated bodily upon the shaft, a condenser and an evaporator each having air impeller elements and each being rigidly mounted on and rotatable with the housing, said condenser and evaporator being mounted on said housing in closely adjacent spaced relationship, fixed chamber-forming means enclosing said evaporator, said chamber-forming means being provided with inlet and outlet air openings whereby air can be circulated through said chamber-forming means as a result of rotation of the housing, and heat insulating means rigidly connected to the chamber-forming means and interposed between the condenser and evaporator.

4. A space cooler comprising a compressor, said compressor including a rotatable housing provided with a stationary rotor shaft therein, a condenser and an evaporator each having air impeller elements and each being rigidly mounted on and rotatable with the housing, fixed chamber-forming means enclosing said evaporator and being provided with inlet and outlet air openings, driving means for rotating said housing, an electro-magnetic clutch operatively interposed between the driving means and the housing, and means responsive to the speed of said driving means for controlling the electro-magnetic interlocking between the clutch and the housing, whereby to rotate the housing at a substantially constant speed.

5. A space cooler comprising a compressor, said compressor including stationary base-forming means having a stationary rotor shaft mounted at one end thereon and extending outwardly therefrom in the provision of an outboard end, a housing including a condenser support plate rigidly connected to said housing and having a hub journaled upon and enclosing the outboard end of the shaft, a condenser mounted on said support plate, an evaporator support plate rigidly connected to said hub in axially spaced relation to the condenser support plate and being adapted to support an evaporator, driving means external to the shaft and housing, means for operatively connecting said housing and said driving means so that the housing is rotated bodily upon the shaft, fixed chamber-forming means enclosing said evaporator, said chamber-forming means being provided with inlet and outlet air openings whereby air can be circulated through said chamber-forming means as a result of rotation of the housing, and means in said hub by which the evaporator can be interconnected to the condenser and compressor.

6. A space cooler comprising a compressor, said compressor including stationary base-forming means having a stationary rotor shaft mounted at one end thereon and extending outwardly therefrom in the provision of an outboard end, a housing including a condenser support plate rigidly connected to said housing and having a hub journaled upon and enclosing the outboard end of the shaft, a condenser mounted on said support plate, an evaporator support plate rigidly connected to said hub in axially spaced relation to the condenser support plate and being adapted to support an evaporator, driving means external to the shaft and housing, means for operatively connecting said housing and said driving means so that the housing is rotated bodily upon the shaft, fixed chamber-forming means enclosing said evaporator, said chamber-forming means being provided with inlet and outlet air openings whereby air can be circulated through said chamber-forming means as a result of rotation of the housing, a fixed insulator plate rigidly connected to said chamber-forming means and being interposed between the condenser and evaporator, and means in said hub by which the evaporator can be interconnected to the condenser and compressor.

7. A space cooler comprising a compressor, said compressor including stationary base-forming means having a stationary rotor shaft mounted at one end thereon and extending outwardly therefrom in the provision of an outboard end, a housing including a condenser support plate rigidly connected to said housing and having a hub journalled upon and enclosing the outboard end of the shaft, a condenser mounted on said support plate, an evaporator support plate rigidly connected to said hub in axially spaced relation to the condenser support plate and being adapted to support an evaporator, said condenser, said chamber-forming means evaporator each being provided with air impeller elements, fixed chamber-forming means enclosing said evaporator and being provided with inlet and outlet air openings whereby air can be circulated through said chamber-forming means as a result of rotation of the housing, and means in said hub by which the evaporator can be interconnected to the condenser and compressor.

8. A space cooler comprising a rotatable housing, a heat transfer unit rotatable with said housing, said unit comprising a pair of spaced plates, air impeller elements connecting said spaced plates, a plurality of fluid conducting conduits joining said plates and projecting therethrough, and hollow cap members secured to said plates and enclosing the ends of the conduits, said cap members thereby forming headers interconnecting the enclosed ends of the conduits to form a single path through which a fluid may flow.

9. A space cooler comprising a rotatable housing, a heat transfer unit rotatable with said housing, said unit comprising a pair of spaced plates, air impeller elements connecting said spaced plates, a plurality of fluid conducting conduits joining said plates and projecting therethrough, a plurality of annular heat transfer disks each secured to each of said conduits, and hollow cap members secured to said plates and enclosing the ends of the conduits, said cap members thereby forming headers interconnecting the enclosed ends of the conduits to form a single path through which a fluid may flow.

10. A space cooler comprising a rotatable housing, a heat transfer unit rotatable with said housing, said unit comprising a pair of spaced plates extending radially outwardly of the axis of said housing, air impeller elements rigidly connected to and extending between said plates, a plurality of fluid conducting conduits joining said plates and extending therethrough, some of said conduits being a greater distance radially outwardly of said axis than others, and hollow cap members secured to said plates and enclosing the ends of the conduits, said cap members thereby forming headers interconnecting the enclosed ends of the conduits to form a single path through which a fluid may flow.

11. A space cooler comprising a rotatable housing, a heat transfer unit rotatable with said housing, said unit comprising a pair of spaced plates extending radially outwardly of the axis of said housing, air impeller elements rigidly connected to and extending between said plates, a plurality of fluid conducting conduits joining said plates and extending therethrough, some of said conduits being a greater distance radially outwardly of said axis than others, and hollow cap members on said plates for enclosing the ends of successive radially inner and outer conduits in the provision of headers discretely interconnecting said enclosed ends whereby to form a single path through which a fluid may flow.

12. A space cooler comprising a compressor, said compressor being provided with a stationary rotor shaft therein, a condenser support plate having a hub and being rigidly connected to said housing, a condenser mounted on said support plate and including a plate spaced from said support plate, a plurality of fluid conduits joining said plates, hollow cap members secured to said plates in such a manner that the conduits are interconnected to form a single flow path, an evaporator support plate rigidly connected to said hub and supporting an evaporator, fixed chamber-forming means enclosing said evaporator plate and being provided with inlet and outlet air openings, a fixed insulator plate rigidly connected to said chamber-forming means and interposed between the condenser and evaporator, and means in said hub by which the evaporator can be interconnected to the condenser and compressor.

13. A space cooler comprising a compressor, said compressor being provided with a stationary rotor shaft therein, a condenser support plate having a hub and being rigidly connected to said housing, a condenser mounted on said support plate, an evaporator support plate rigidly connected to said hub and supporting an evaporator, said evaporator including a plate spaced from the evaporator support plate, a plurality of fluid conduits joining said last-mentioned plates, hollow cap members secured to said last-mentioned plates in such a manner that the conduits are interconnected to form a single flow path, fixed chamber-forming means enclosing said evaporator plate and being provided with inlet and outlet air openings, a fixed insulating plate rigidly connected to said chamber-forming means and interposed between the condenser and evaporator, and means in said hub by which the evaporator can be interconnected to the condenser and compressor.

14. A space cooler comprising a compressor, said compressor including a rotatable housing provided with spaced inlet and outlet ports, a fixed rotor shaft mounted within said housing and being provided with a portion eccentric to the axis of rotation of said housing, a rotor rotatably mounted on said eccentric portion, a compressor vane rockably secured at its outer end to said housing and adapted for slide fitting reception within the rotor eccentric of the axis thereof for forming a fluid barrier between said ports, a condenser support plate having a hub and being rigidly connected to said housing, a condenser mounted on said support plate, an evaporator support plate rigidly connected to said hub and being adapted to support an evaporator, fixed chamber-forming means enclosing said evaporator and being provided with inlet and outlet air openings, and means in said hub by which the evaporator can be interconnected to the condenser and inlet port of the compressor.

References Cited in the file of this patent

UNITED STATES PATENTS

| | | |
|---|---|---|
| 1,155,780 | Audiffren et al. | Oct. 5, 1915 |
| 1,584,243 | Perkins et al. | May 11, 1926 |
| 2,056,023 | Stevenson | Sept. 29, 1936 |
| 2,229,500 | Goldsmith | Jan. 21, 1941 |
| 2,415,011 | Hubacker | Jan. 28, 1947 |
| 2,440,593 | Miller | Apr. 27, 1948 |
| 2,449,888 | Edwards | Sept. 21, 1948 |
| 2,522,781 | Exner | Sept. 19, 1950 |
| 2,609,672 | Wales | Sept. 9, 1952 |
| 2,898,032 | Katzenberger | Aug. 4, 1959 |

FOREIGN PATENTS

| | | |
|---|---|---|
| 45,734 | Denmark | May 18, 1932 |
| 162,557 | Switzerland | Sept. 1, 1933 |